Patented Dec. 3, 1946

2,412,156

UNITED STATES PATENT OFFICE 2,412,156

RETARDER

George D. King, Chicago, and Manvel C. Dailey, Elmhurst, Ill., assignors to United States Gypsum Company, Chicago, Ill., a corporation of Illinois No Drawing. Application November 4, 1940, Serial No. 364,240

20 Claims. (Cl. 106—112)

The present invention relates to an improved form of retarder, such as is used for prolonging the time of set of gypsum plasters and the like, and also to methods for its preparation.

One of the objects of the invention is to provide a retarder which is stabilized against deterioration by age, so that it will not change in its retarding characteristics when incorporated with plaster and the plaster subsequently is put into storage.

A further object of the invention is to prepare a retarder consisting of hydrolyzed keratinaceous material, lime, and some form of carbon dioxide or carbonate, preferably by carbonation of the finished retarder either by means of carbon dioxide gas or by means of a water-soluble carbonate.

While keratinaceous retarders are quite old in the art of preparing set-retarded plasters, a difficulty is found in connection with these retarders in that their retarding efficiency changes with age. Prior art retarded plasters stored under weather conditions favoring rapid change in setting time may be affected so that an increase of 100 per cent in setting time within a period of about two weeks is observable. Setting time may further increase 200 to 300 per cent after two or three months of storage under such conditions. This variation in setting time with age leads to trouble with slow set on the job when old plasters are used; and in order to be assured of uniform setting characteristics, it is necessary to use fresh, unaged plaster. On the other hand, a plaster containing a retarder made in accordance with the present invention will increase but slowly in setting time and in some cases not at all, even after storage for six months under severe aging conditions, which, it will at once be apparent, is a very great advantage.

In accordance with the prior art, a retarder may be prepared by digesting a quantity of keratinaceous material, such as pulverized animal hair and hoofs, in a solution of caustic soda at elevated temperatures and at atmospheric or superatmospheric pressures. To the resulting properly hydrolyzed mass, quicklime or hydrated lime is added. The amount of quicklime may be so regulated that it combines chemically with a large proportion of the water present and the remaining water is driven off by the heat of reaction whereby a dry product results. If lesser amounts of quicklime are used or if hydrated lime is substituted, the excess water may be removed by external means, such as heating. For example, a retarder of the prior art may be prepared as follows: 800 pounds of pulverized animal hoofs, hair, or other type of keratinaceous material, are introduced into 1000 pounds of water in which there have been dissolved 160 pounds of 70 per cent sodium hydroxide, which is the commercial strength of caustic soda. The protein is heated in this sodium hydroxide solution at a temperature of about 190° F. for a period of about 3 hours. The resultant hydrolyzed mass is mixed with 1200 pounds of quicklime. The quicklime reacts with the water in the mixture to form calcium hydroxide, thus liberating a large amount of heat. As a result of this heating, excess water is evaporated so that eventually a granular product is obtained which is substantially dry. It is apparent that the quantities recited may be varied as desired to suit the type of raw materials employed, strength of retarder required, etc. If desired, quicklime may be added in amounts insufficient to effect complete drying of the mass or hydrated lime may be substituted. In either case drying is completed by external means. The final product thus obtained is a pulverulent granular material which may be ground fine enough to permit of mixing with the plaster.

As thus far described, the process is a description of the prior art. The present invention is an improvement thereon and differs in that carbon dioxide in some form is introduced into the retarder. In accordance with this invention, this may be done in a number of ways, such as by carbonating the retarder prior to the elimination of all of the water by introducing carbon dioxide gas into it or by adding a water-soluble carbonate to the dissolved keratinaceous material prior to the addition of the lime thereto. Both methods produce similar results. Variations of these processes may also be practiced.

In preparing the retarder by the first alternative (i. e., by the introduction of the carbon dioxide gas), in accordance with one embodiment of this invention, one method of procedure is as follows: The gelatinous glue-like hydrolyzed protein is mixed with quicklime in a pressure-tight vessel in which the original hydrolysis with the caustic soda has taken place, either at atmospheric or superatmospheric pressure, as above described. We prefer to regulate the water-quicklime ratio so that complete drying will not be effected by the lime added. Preferably, about 5 per cent to 10 per cent of free water should remain in the limed retarder after hydration of the lime. Satisfactory results are obtained, however, with greater or lesser amounts of free water than indicated. Carbon dioxide gas is then introduced into the vessel so as to build up a pressure inside the vessel of about 5 pounds per square inch superatmospheric, equivalent to about 20 pounds absolute pressure. An alternative process is to proportion the water-quicklime ratio so as to effect complete drying by reaction of water with quicklime, seal the pressure-tight vessel prior to completion of hydration of the lime, and carbonate in the manner indicated. Upon release of pressure following completion of carbonation, the remaining free water will be automatically released. The pressure vessel may be provided with agitators which are kept running to accelerate the absorption of the carbon dioxide, which may require about 30 minutes. The amount by weight of carbon dioxide gas which is allowed to become absorbed by the retarder mix lies preferably between 5 per cent and 10 per cent based on the total weight of finished retarder, or about 20 per cent on the basis of the ground hoofs or other keratinaceous material employed, although it has been found that as little as 2 per cent of carbon dioxide calculated on the dry weight of the entire mass will give useful results, and an absorption as high as 15 per cent (calculated on the dry weight of the entire mass) is also effective. However, if the 15 per cent is exceeded the results are not as desirable as they are between 5 per cent and 10 per cent, for a decrease in the efficiency of the retarder occurs. After the desired amount of carbon dioxide has been absorbed, free moisture is removed from the material by opening the autoclave and allowing the material to dry, either naturally or assisted by artificial means. Finally, the dry retarder is suitably ground to a fineness which permits its incorporation with the plaster. It is not necessary to employ pure $CO_2$ gas for the carbonation. We have found, for example, that lime kiln flue gas, containing 20 per cent to 40 per cent of $CO_2$, is a satisfactory source of cheap $CO_2$ for this process. Ordinary flue gas from boilers or furnaces, with a $CO_2$ content as low as 7.5 per cent to 10 per cent may also be employed. The other gaseous constituents of such mixtures do not affect the quality of the final product, although of course the carbonation reaction proceeds with greater speed as $CO_2$ concentration is increased. The pressure required for carbonation is not critical, and our process may be employed under any pressure from atmospheric and upward. However, time requirements for effecting the desired degree of carbonation are reduced by operating under positive pressure.

If instead of using carbon dioxide gas it is desired to introduce the carbonate ingredient by means of a salt, the process may be carried out as follows: After the keratinaceous material has been digested by the caustic soda, which in this case, if desired, need not be done under pressure, there is added to the glue-like mass, prior to the introduction of the lime, a suitable quantity of a soluble carbonate, such for example as ammonium carbonate, ammonium bicarbonate, sodium carbonate, sodium bicarbonate, or equivalent other water-soluble salts of carbonic acid. Sufficient carbonate is preferably added to produce a $CO_2$ content of about 5 per cent on the basis of the finished dry retarders. The agitators are kept running to insure a complete solution or dispersion of these carbonates within the hydrolyzed keratin solution, and thereafter quicklime is added, in exactly the same manner as in preparing ordinary retarder of the prior art. The drying and grinding steps are similar to those employed in the prior art. We do not attempt to explain the reaction which occurs with carbonation to impart the unique characteristics of increased stability to retarders prepared in accordance with our disclosure. The reaction is evidently more complex than the mere carbonation of a portion of the added lime or caustic soda. We have found, for example, that retarder prepared with addition of powdered limestone or calcium carbonate, or a mixture of quicklime and limestone, in place of lime, is no more stable or resistant to change in strength with aging than the prior art retarder. It may be that carbonation of a limed retarder mix, or addition of a soluble carbonate to such a mix, results in the formation of a complex calcium proteinate containing carbonate in the molecule, which material is essentially more stable and resistant to chemical changes upon exposure to air than the prior art type of product. Regardless of any theory, it is known that the process described produces a retarder which is essentially stable and resistant to changes in strength on passage of time.

Both methods of producing the retarder yield substantially equivalent results, and they are both considered to be part of the same invention.

In order to demonstrate the advantages which are obtained by the use of the present invention there is shown hereinbelow, in the form of a table, the setting time of set-stabilized plaster, using on the one hand ordinary untreated retarder and on the other hand the retarder of the present invention. The term "set-stabilized plaster" is intended to cover a plaster of the calcium sulfate type which is stabilized as to its setting time against the adventitious admixture of either retardive or accelerative influences, such types of plasters being fully described in the patents to Gallagher, No. 1,683,539, and King, Nos. 1,989,641, 2,078,198, 2,078,199 and 2,078,200. While the plasters of the aforementioned patents maintain their setting time irrespective of whether further retarder or further accelerator gets into them, they nevertheless exhibit an increase in setting time as they get older, and it is this defect that the present invention cures. In other words, the plasters made in accordance with the present invention are set-stabilized not only against job retardive and accelerative influences but also against lapse of time, which is a distinct improvement over anything that has ever been done in this art. In the table therefore, where mention is made of a lime-alum plaster formula with untreated retarder, this refers, for example, to the plaster of King patent No. 1,989,641, while where mention is made of carbonated retarder, the retarder of the present invention is referred to.

*Setting times of aged plasters*

| Plaster | Mix | Fresh | | 2 wks. | | 4 wks. | | 6 mo. | |
|---|---|---|---|---|---|---|---|---|---|
| | | Hrs. | Min. | Hrs. | Min. | Hrs. | Min. | Hrs. | Min. |
| Lime-alum plaster formula with untreated retarder | Neat [1] | 3 | 55 | 8 | 00 | 8 | 55 | 13 | 00 |
| | 2½ sanded [2] | 4 | 55 | 6 | 30 | 7 | 55 | 9 | 50 |
| Lime-alum plaster formula with $CO_2$ treated retarder | Neat | 4 | 55 | 6 | 00 | 6 | 40 | 7 | 35 |
| | 2½ sanded | 4 | 10 | 4 | 45 | 4 | 55 | 5 | 50 |
| Lime-alum formula with untreated retarder | 2½ sanded | 4 | 40 | | | | | 12 | 00 |
| Lime-alum formula with carbonate-treated retarder (($NH_4$)$HCO_3$) | 2½ sanded | 5 | 20 | | | | | 6 | 15 |

[1] Neat: Mixed with water only on glass mixing board.
[2] 2½ sanded: Mixed with 2½ parts of washed sand and water on glass mixing board.

Referring to the above table, the terms "neat" and "sanded" are fully explained in the table itself. All plasters therein mentioned were aged under similar temperature and humidity conditions.

It will be seen, referring for the moment to the $CO_2$ treated retarder and comparing it with untreated retarder in the set-stabilized plaster, that in the neat test the original setting time of the latter was 3 hours and 55 minutes, which increased at the end of 6 months to 13 hours, while in the sanded test the original setting time was 4 hours and 55 minutes, which increased in 6 months to 9 hours and 50 minutes. In the case of the gas-carbonated retarder, however, on the sanded test the setting time originally was 4 hours and 10 minutes, at the end of four weeks it was 4 hours and 45 minutes, and at the end of six months it had increased to only 5 hours and 50 minutes. These tests indicate what a remarkable degree of stabilization has been attained. Comparing this with a retarder carbonated with, for example, ammonium bicarbonate, it will be seen that the setting time was 5 hours and 20 minutes when freshly made and at the end of 6 months it had increased by only 55 minutes to a time of 6 hours and 15 minutes. Comparing this with a set-stabilized plaster with an untreated retarder, it will be seen that the latter when freshly made had a set of 4 hours and 40 minutes, and at the end of six months it had increased to 12 hours.

Our new stabilized retarder may of course also be used to advantage in plasters which do not contain the job set-stabilizing ingredients such as alum and lime.

From what has been said hereinabove, it will be quite apparent that a great advance has been made in the stabilization not only of the retarders but of set-stabilized plasters containing the same. It is to be understood that the use of equivalent keratinaceous materials or the substitution of other proteins therefor, such as soy bean meal, sponge waste, fish scrap, etc., is to be considered as within the scope of the present invention, for which the following is claimed.

We claim:

1. The process of producing a plaster retarder comprising partially carbonating an alkaline, hydrolyzed, proteinaceous material with a carbonating agent to produce a retarder containing less than about 15 per cent by weight of combined carbon dioxide (dry basis).

2. The process of producing a plaster retarder comprising partially carbonating an alkaline, hydrolyzed, proteinaceous material by addition of carbon dioxide.

3. The process of producing a plaster retarder comprising partially carbonating an alkaline, hydrolyzed, proteinaceous material by the addition of 2 to 15 per cent by weight of carbon dioxide gas thereto based on the dry weight of the finished retarder.

4. The process of claim 2 in which the carbonation is carried out at superatmospheric pressure.

5. The process of producing a plaster retarder comprising partially carbonating an alkaline, hydrolyzed, proteinaceous material by the addition of a water-soluble carbonate thereto in an amount to provide a carbonated retarder having a combined carbon dioxide content of less than about 15 per cent by weight (dry basis).

6. The process of producing a plaster retarder comprising hydrolyzing a protein material with an alkali, adding lime to the resulting mixture, and partially carbonating the resultant material by adding carbon dioxide gas thereto.

7. The process of producing a plaster retarder comprising hydrolyzing a protein material with an alkali, adding lime to the resulting mixture, and partially carbonating the resulting material by adding a water-soluble carbonate thereto in an amount to provide a carbonated retarder having a combined carbon dioxide content of less than about 15 per cent by weight (dry basis).

8. The process of producing a calcined gypsum plaster retarder which comprises hydrolyzing keratinaceous material with alkali, adding lime thereto and treating the said retarder mixture by confining it in a closed airtight space and forcing into said space carbon dioxide so as to build up superatmospheric pressure within the space to facilitate the absorption of the carbon dioxide.

9. The process of producing a calcined gypsum plaster retarder which comprises treating keratinaceous material, such as animal hoofs, with water and sodium hydroxide at a temperature of about 190° F. for about three hours to hydrolyze the said keratinaceous material, carrying out the aforesaid operation in a vessel capable of being made pressure tight, adding quicklime thereto and then introducing into the resultant mixture carbon dioxide at superatmospheric pressure while maintaining in the vessel a pressure above that of the atmosphere, to carbonate the alkaline content of the mixture to a degree sufficient to stabilize the resulting retarder.

10. The process of producing a retarder which comprises hydrolyzing keratin by means of sodium hydroxide, adding a soluble carbonate thereto in an amount such that the total combined carbon dioxide content of the resulting retarder is less than about 15 per cent by weight (dry basis), and then adding quicklime, and drying the resulting mixture.

11. The method of protecting hydrolyzed proteid retarder against changes in its efficiency, which comprises partially carbonating the retarder with a carbonating agent under conditions to produce a carbonated retarder having less than about 15 per cent by weight (dry basis) of combined carbon dioxide.

12. A plaster retarder comprising a carbonated hydrolyzed protein having a combined carbon dioxide content of less than about 15 per cent by weight (dry basis).

13. A plaster retarder comprising a carbonated, hydrolyzed keratin having a combined carbon dioxide content of less than about 15 per cent by weight (dry basis).

14. A plaster retarder comprising a hydrolyzed protein, lime, and a carbonate formed therein by chemical means, the carbonate having a combined carbon dioxide content of less than about 15 per cent by weight (dry basis) of the retarder.

15. A plaster retarder comprising a mixture of hydrolyzed keratin and lime, protected against deterioration by absorbed carbon dioxide.

16. A set-stabilized gypsum plaster comprising a set-accelerating material and a protein retarder, the latter containing combined carbon dioxide in an amount less than about 15 per cent by weight (dry basis) of the retarder.

17. A set-stabilized gypsum plaster composition comprising a major portion of calcined gypsum and a minor portion of a set-stabilizing composition which comprises an accelerator and a retarder which has absorbed carbon dioxide.

18. A set-stabilized plaster comprising a major portion of calcined gypsum and a minor portion of a set-stabilizing composition which comprises alum, lime and a keratinaceous retarder, which latter has absorbed a form of carbon dioxide.

19. The retarder recited in claim 14 wherein the carbon dioxide of the carbonate constitutes between about 5 and 10 per cent by weight of the retarder.

20. The gypsum plaster recited in claim 16 wherein the combined carbon dioxide content of the retarder constitutes between about 5 and 10 per cent by weight of the retarder.

GEORGE D. KING.
MANVEL C. DAILEY.